Figure 2:
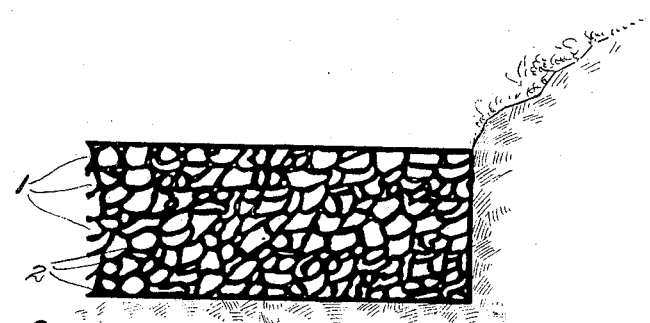

J. H. AMIES.
METHOD OF MANUFACTURING A COMPOSITION FOR PAVING AND LIKE PURPOSES.
APPLICATION FILED NOV. 15, 1909.

1,062,686.

Patented May 27, 1913.

WITNESSES:
E. G. Koller
Agnes Caskey

INVENTOR.
Joseph Hay Amies
BY
William J. Jackson
ATTORNEY.

UNITED STATES PATENT OFFICE.

JOSEPH HAY AMIES, OF PHILADELPHIA, PENNSYLVANIA, ASSIGNOR TO AMIES ASPHALT COMPANY, A CORPORATION OF SOUTH DAKOTA.

METHOD OF MANUFACTURING A COMPOSITION FOR PAVING AND LIKE PURPOSES.

1,062,686.     Specification of Letters Patent.     Patented May 27, 1913.

Application filed November 15, 1909. Serial No. 528,086.

*To all whom it may concern:*

Be it known that I, JOSEPH HAY AMIES, a citizen of the United States, residing at Philadelphia, in the county of Philadelphia and State of Pennsylvania, have invented a certain new and useful Improved Method of Manufacturing a Composition for Paving and Like Purposes, of which the following is a specification.

This invention has relation to compositions for roads, streets and sidewalk paving, paths, cellar bottoms, roofs and like purposes and has more particular relation to the manner herein described of securing compositions calculated to be free of voids. Many attempts have been made but without success to secure a practical degree of compactness. Among the attempts that more closely approached securing this result was that of the formation of asphalt blocks composed of fragments of broken stone of various sizes mixed with hot asphalt cement and then subjected to pressure. These blocks did not sufficiently shut out air and water from the paving interior and so age-lasting endurance was not secured. To provide a voidless paving possessed of perfect compactness where the composition thereof is partly made up of asphalt or other binder, it is important that the binder be hermetically sealed as it were to preserve it from deterioration and aging. Other attempts have been made with the same objects in view by making a composition consisting of stones of different sizes, coated separately and in as nearly uniform sizes as possible with hot bituminous binders, the said composition being then laid in layers using the largest sizes of coated stones for a base and grading the succeeding layers in progressively smaller sizes of coated stones until the ulterior facing was provided. Still further attempts along the same lines have been made by using graded stone in ascertained sizes and proportions of the mineral aggregate, heating the same in a combined form and mixing therewith a hot binder and then laying the resultant composition and compressing the same to a face. In all of these compositions, the end sought to be attained has fallen short, due to the fact that a sufficient degree of solidity to perfectly shut out air and water was not procured, therefore the paving constructed therefrom failed to possess age-lasting endurance.

The principal object of the present invention is to overcome the above-recited disadvantageous features and to provide a paving composition which, when laid, shall be perfectly free of voids, and in which abrasion of the mineral particles thereof shall be eliminated. With these and other objects in view, the invention consists of the improvements hereinafter described and finally claimed, reference being had to the accompanying drawings, forming part hereof and in which—

Figure 3:
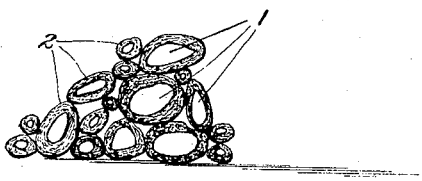
Figure 4:
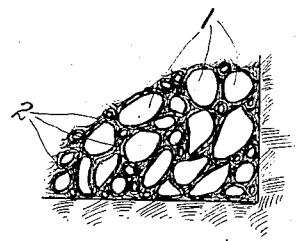

Figure 1, is a fragmentary diagrammatic view of the binder covered particles of the paving composition of the invention prior to being compressed, Fig. 2, is a similar view illustrating the binder covered particles of the composition of the invention as finally compressed, and Fig. 3, illustrates the mineral particles as coated in accordance with the invention.

In the present invention, the process of making the composition is as follows:—Broken stone and preferably paper in bulk are placed together in a mixing machine. The mixer in operating serves to agitate the stones and paper and cause the stones to grind and tear the paper into relatively small pieces, the grinding operation being continued until the paper fibers become somewhat balled or agglomerated. If the grinding operation was carried on beyond this point, the paper would be converted into dust and its usefulness lessened or destroyed. The balled or agglomerated condition of the paper is retained throughout the life of the paving when laid and the balls of paper have the tendency to work to the top thereof where they form, with reference to the harder or stone portions of the paving, cushions or binders. While the mixer is still operating, a bituminous cement is thrown in upon the stones and paper and when the same are well mixed together, the composition is immediately dumped therefrom. Heretofore fibers have always been comminuted previously to being mixed with gravel and sand. This operation makes the paving material too costly. By the above described process, the agitation of the stones and fibers together reduces the cost of the application of fibers sufficiently to provide a commercially valuable paving composition.

In the making of stone pavements only what is technically called trap rock can be used. This rock is a hard granite weighing usually about 100 pounds to the cubic foot. The coarser and finer particles of this rock will bond with its own dust. While there is a large quantity of trap rock yet it is confined to but a few localities and these are adjacent to only a very small part of the area of road building. On the other hand, limestone and sand rock cannot be used for road building, because they are too soft to withstand shock and the attrition of traffic, and because they will not bond with their own dust. Limestone and sandstone however can be found generally over a very large area of the road making fields. This improvement will make these hitherto useless materials almost as desirable for road making as the said trap rock, and thus vastly reduce the expense of road building and maintenance.

The crushed stone as it comes from the crusher is of varied sizes. I may however use crushed stone of a uniform size. This crushed stone is preferably placed as described in a mixing machine and while I may use in connection therewith fibrous material such as sea peat, swamp peat, sugar cane refuse, manila, hemp, comminuted or shredded paper, or paper pulp or pulped paper, chopped or ground hay or straw corn fodder, saw dust and the like, I preferably use refuse paper. This refuse paper will be placed among the agitated mineral aggregates and then the bituminous cements are added. In this way the paper becomes readily comminuted. Refuse paper is preferred, because in the making of paper heavy compression has already been applied to the fibers of which it is composed. It has been found in practice that in order to secure against the abrasion of soft sand stone and lime stone and to secure other desired results it is desirable to use paper in bulk, in quantities of about 200 pounds to each 1800 pounds of broken stone. With the above about 150 pounds of bituminous cement is mixed to provide a commercially valuable composition. The mineral particles thus coated as described, upon their removal from the mixing machine are diagrammatically illustrated in Fig. 3, of the drawings, the mineral particles being designated 1, and the combined fibrous material and bituminous binder being designated 2. Referring now to Fig. 1, the composition of the invention is applied to any suitable base. Compression is now applied to the paving as by rolling in order to attain a perfect filling of all voids of the paving. As compression is applied, the fibrous-bituminous binder coatings 2, being resilient or cushion-like, will move so as to spread among the mineral particles and lodge within and fill up all openings between the various mineral particles as shown in Fig. 2. The result of this moving or shifting of the bituminized fibrous matter will result in providing a voidless pavement. The fibrous-bituminous binder serves an additional purpose, reference to which will now be given. Ordinarily bituminous pavings wear away because of the fact that the binder does not sufficiently dissipate shocks and attrition of traffic. The mineral particles are brought together under the rolling process and the unequal and rough sides of the said particles will vibrate under hard shocks and rub or grind against each other. In cold weather, the binder becomes hard and brittle and finally through aging becomes permanently so. This brittle condition of the binder together with the grinding and rubbing process just referred to serves to cause the binder to crumble into a powder, at which time raveling of the paving begins. By the providing of a cement or binder of age-lasting qualities and associating therewith a secondary elastic filler, that is, the fibrous material herein referred to, these objectionable features are eliminated.

Crushed stone being of varied and comparatively small size, it would be impractical to calk the same by hand with the fibrous-bituminous matter after the stone is laid and hence the operation of mixing the stone particles with the fibrous matters while in the mixing machine.

What I claim is:—

1. The herein described method of manufacturing a paving composition which consists in placing together in a mixing machine broken stone and fibrous material in bulk, operating the mixer to secure tearing of the fibrous material into relatively small pieces said tearing of the fibrous material resulting from the grinding action of the stones in the operation of the mixer, continuing the operation of the mixer to well distribute the fibrous material among the broken stones and while the mixer is still being operated adding to the said broken stones and fibrous material a bituminous cement and continuing the operation of the mixer until said cement becomes well mixed with the agitating stones and fibrous material whereupon the finished composition is immediately dumped from the mixer.

2. The herein described method of manufacturing a paving composition which consists in placing together in a mixing machine broken stone and paper in bulk, operating the mixer to secure tearing of the paper into relatively small pieces said tearing of the paper resulting from the grinding action of the stones in the operation of the mixer, continuing the operation of the mixer until the paper fibers become somewhat balled or agglomerated said operation serving to well distribute the paper fibers thus balled or agglomerated among the broken stones and while the mixer is still being operated adding to the said broken stones and torn paper a bituminous cement and continuing the operation of the mixer until said cement becomes well mixed with the agitating stones and paper, whereupon the finished composition is immediately dumped from the mixer.

In testimony whereof I have hereunto signed my name.

JOSEPH HAY AMIES.

Witnesses:
WILLIAM J. JACKSON,
AGNES CASKEY.